(12) United States Patent
Carney

(10) Patent No.: US 6,366,648 B1
(45) Date of Patent: Apr. 2, 2002

(54) REMOTELY ACCESSED ALARM SYSTEM

(76) Inventor: William P. Carney, 4 High Ridge La., Oyster Bay, NY (US) 11771

( * ) Notice: Subject to any disclaimer, the term of this patent is extended or adjusted under 35 U.S.C. 154(b) by 0 days.

(21) Appl. No.: 09/547,053

(22) Filed: Apr. 10, 2000

(51) Int. Cl.[7] .............................................. H04M 11/00
(52) U.S. Cl. ............................... 379/41; 379/42; 379/47
(58) Field of Search .............................. 379/40, 41, 42, 379/43, 44, 46, 47, 48, 49, 50, 51; 340/531, 539

(56) References Cited

FOREIGN PATENT DOCUMENTS

JP            404180200 A   *  6/1992   ............ G02B/25/08

* cited by examiner

Primary Examiner—Stella Woo
Assistant Examiner—Melur. Ramakrishnaiah

(74) Attorney, Agent, or Firm—Charles E. Temko

(57) ABSTRACT

An alarm system for recording the occurrence of an alarm condition in a predetermined space comprises a self-contained monitor which defines a sensor armed for sensing the alarm condition and a monitor transmitter which transmits a monitor signal in response thereto. In addition, the system comprises an interface module responsive to the monitor signal which communicates with a telephone line and a telephone answering machine associated with the predetermined space. The interface module includes an interface receiver circuit, a message generator which provides an alarm message, an off-hook telephone circuit, a telephone line simulator and a transfer switch. In response to the monitor signal, the interface receiver circuit operates the transfer switch to an activated position wherein the alarm message is transmitted from the message generator through the off-hook telephone circuit, the telephone line simulator and the transfer switch to the telephone answering machine for recording thereon. Subsequently, the user calls the telephone line to access the answering machine in order to retrieve the alarm message.

19 Claims, 6 Drawing Sheets

REMOTELY ACCESSED ALARM SYSTEM

BACKGROUND OF THE INVENTION

1. Field of the Invention

This invention relates generally to alarm systems and more particularly to a self-contained monitor surveilling a predetermined space in a premises for an occurrence of an alarm condition. The self-contained monitor communicates with a telephone answering machine such that the occurrence of the alarm condition is recorded on the answering machine and may be subsequently retrieved therefrom by an authorized user.

2. Description of Related Art

Alarm systems which may be accessed and tested by an authorized user are well known in the art. In certain systems, the authorized user calls a telephone number associated with the system and is connected directly thereto in order to prompt either a response regarding its status or to reprogram selected system functions.

Self-contained monitors that surveil a predetermined space in a premises for a specific alarm condition are also known in the prior art. One such device, a Passive Infrared (PIR) monitor surveils the predetermined space for an intruder. This type of monitor is either armed and disarmed by a coded input to a keypad which is an integral part of the monitor or is armed, disarmed and tested by a remote controller which transmits a Radio Frequency(RF) signal that is activated by an authorized user. When employing a system having a remote controller, a returning occupant is able to stand outside his or her premises and, before entering, test the monitor to determine if an intruder remains therein in order to avoid a dangerous confrontation. When employing a monitor which utilizes a keypad, the returning occupant cannot test the monitor from outside the predetermined space and therefore enters the premises to disarm the monitor using the keypad thereby risking the possibility of encountering a remaining intruder.

Further, there are self-contained alarm monitors available in the industry which may be positioned in a premises to monitor for an alarm condition other than a break-in, for example, smoke or freezing temperatures. Generally, such monitors are used in a system which includes an automatic dialer that is programmed to dial the telephone number of a phone located outside the premises in order to alert a person answering the phone that an alarm condition exists at the premises.

U.S. Pat. No. 4,085,292 which issued to David L. Leslar, and John C. Kirk on Apr. 18, 1978 discloses an improved combination alarm and automatic telephone answering system for connection to a telephone line which is adapted to permit a person to determine the existence of one or more alarm conditions at a remote location by telephoning a predetermined telephone number at the remote location and listening for a coded signal indicative of normal or alarm conditions. In an optional mode, the incoming call is not answered to thereby signify normal conditions. The telephone answering system taught by Leslar does not comprise a standard telephone answering machine. Leslar's answering system includes a line grabbing circuit which enables a sequence interrogator to select one or more alarm sensors in succession so that if an alarm condition is detected, a long single tone is fed into the telephone system. Leslar does not teach an alarm monitor that transmits an alarm message to a user's standard telephone answering machine to be recorded thereon. In addition, Leslar does not disclose a system wherein the authorized user can either dial the telephone number of his or her answering machine from a distant telephone in order to remotely retrieve the alarm message or enter his or her premises and manually activate a speaker which is normally an integral part of a standard telephone answering machine in order to locally retrieve the alarm message therefrom. Finally, Leslar does not disclose a self-contained monitor which communicates with an answering machine via RF signals.

U.S. Pat. No. 5,402,466 which issued to Thomas C. Delahanty on Mar. 28, 1995 teaches an automatic paging system that will alert a paging service subscriber to the occurrence of specific events at a remote location. The paging system works in conjunction with a user's existing paging subscription services and answering machine which is employed to record incoming calls originating from a caller using a distant phone. The system detects if either a valid message has been left on the answering machine by the caller or if an alarm has been tripped. Should either event occur, the system dials a number that the user programs into the system that corresponds to the paging service number, waits for an acknowledgement tone from the paging service, and then dials a distinct code that corresponds to what has occurred at the remote location. The system will forward a telephone number to the paging service subscriber, if such a number has been entered into the answering machine by the caller. When an alarm is tripped, the phone line is seized and the system dials the preprogrammed pager number, waits for the acknowledgement tone, and then transmits a numerical code depending on which alarm has been triggered. Delahanty does not teach a self contained monitor which, when tripped, causes an alarm message to be transmitted to the user's answering machine which may be queried either remotely by the user calling from a distant telephone or locally by the user manually activating a speaker which is part of the telephone answering machine in order to listen to the alarm message recorded thereon. The answering machine disclosed by Delahanty is employed to record routine incoming messages from callers attempting to reach the occupant of the premises in which his system is located. Delahanty's answering machine does not communicate with a self-contained alarm monitor in order to record the occurrence of an alarm condition on the answering machine which may be queried by an authorized user of the system.

U.S. Pat. No. 5,808,547, a continuation-in-part of U.S. Pat. No. 5,621,385, which issued to the applicant of the present invention, William P. Carney, on Sep. 15, 1998 discloses an intrusion detection system used to surveil a predetermined space in a premises for an occurrence of an intrusion wherein a self-contained monitor may be armed, disarmed and tested by a remote controller transmitting an RF signal initiated by a user manipulating a button switch. In addition, the disclosure teaches that the transmitting device operates in a manner similar to a garage door opener. However, the disclosure does not teach a self-contained monitor which communicates the occurrence of the intrusion via RF signaling to the occupant's standard telephone answering machine located in the premises so that the occupant can interrogate the answering machine to check for the intrusion.

As can be seen from the foregoing, there is a need in the industry for a cost effective alarm system in which a self-contained monitor communicates the occurrence of an alarm condition to a standard telephone answering machine located in a premises, thus enabling an occupant to interrogate the answering machine for the occurrence of the alarm condition. Further, there is a need for a means by which to easily adapt the standard telephone answering machine to enable it to communicate, via RF signaling, with the self-contained monitor so that both the answering machine and the monitor may be positioned at optimum locations within the premises without concern for any wiring required to interconnect them. Finally, there is a need for such a system in both apartment buildings and houses wherein it is convenient and cost effective for an occupant to utilize his or her existing telephone answering machine as part of the system and inconvenient and costly to install the wiring and special telephone equipment normally required for prior art systems.

SUMMARY OF THE INVENTION

The present invention is directed to an alarm system that solves the problem of providing a simple and cost effective means by which a self-contained monitor communicates the occurrence of an alarm condition in a predetermined space to a standard telephone answering machine associated therewith, thus enabling the user to interrogate the answering machine for telephone messages left thereon by callers and for the occurrence of the alarm condition.

The present invention comprises a self-contained monitor which defines a sensor armed for sensing the alarm condition and a monitor transmitter coupled to the sensor which transmits a monitor signal in response thereto. An interface module communicates with a telephone line and a telephone answering machine associated with the predetermined space. The interface module includes an interface receiver circuit which receives and processes the monitor signal, a message generator which provides an alarm message, an off-hook telephone circuit which has a message input and a message output, a line simulator which has a simulator input and a simulator output which provides a telephonic connection therethrough and which applies a ringing voltage to the simulator output, and a transfer switch which has a normal position and an activated position. The message generator is coupled to the message input, the message output is coupled to the simulator input, the transfer switch is coupled to the simulator output and the interface receiver circuit. Further, the telephone answering machine is coupled to the telephone line in the normal position, is disconnected therefrom and coupled to the simulator output in the activated position, also, the message generator, the off-hook telephone circuit and the line simulator are activated therein. Responding to the monitor signal, the interface receiver circuit operates the transfer switch to the activated position wherein the off-hook telephone circuit prompts the line simulator to apply the ringing voltage which causes the telephone answering machine to pick up thereby completing the telephonic connection through which the alarm message is transmitted from the message generator to the telephone answering machine.

In addition, the interface receiver circuit further comprises a timing circuit which holds the transfer switch in the activated position for a time period at least long enough for the alarm message to be recorded on the answering machine before prompting the transfer switch to return to the normal position. Subsequently, the user calls the telephone line to access the answering machine in order to retrieve the alarm message.

DETAILED DESCRIPTION OF THE PREFERRED EMBODIMENTS

Before describing the details of the embodiments of the present invention, a discussion of a prior art remotely controlled self-contained intrusion alarm monitor is considered apposite.

Figure 1:
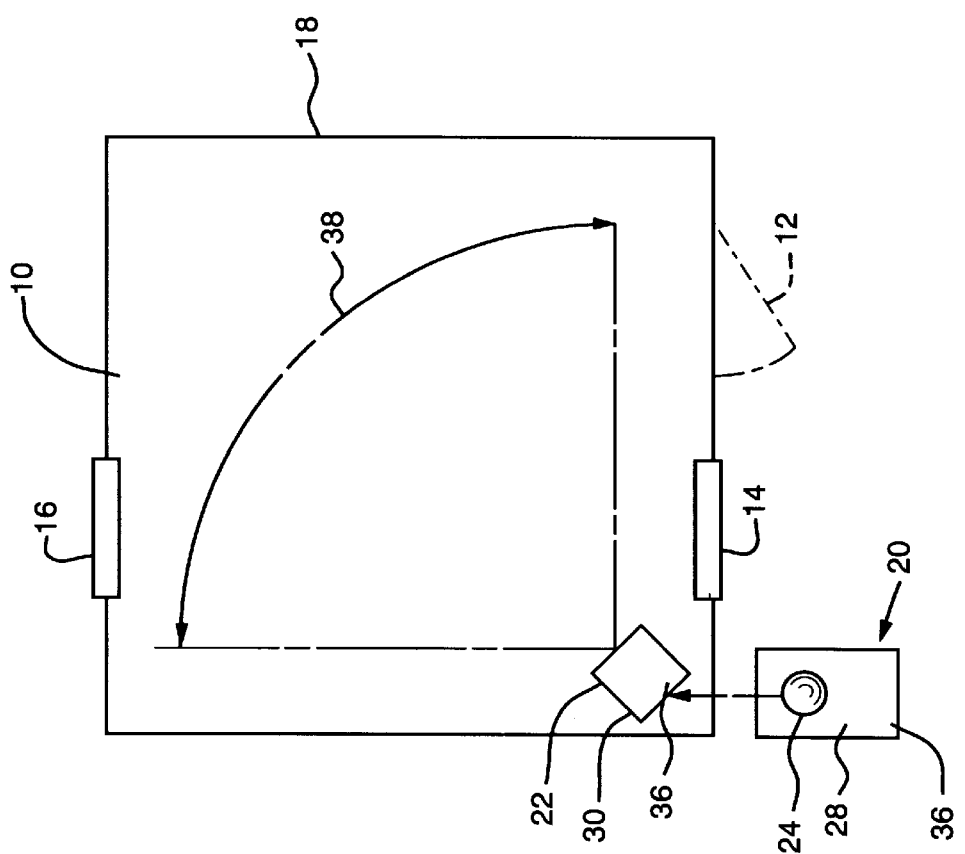
FIG. 1 illustrates a prior art intrusion detection system.

Turning now to the Figures, there is shown in FIG. 1, by way of explanation, a prior art intrusion detection system used to monitor a predetermined space 10 for an intruder. The space 10 includes a door 12 and may or may not include additional openings such as a front window 14 and a rear window 16 depending on a particular premises 18 in which the system is deployed. The system comprises an authorized remote controller generally referred to by reference number 20 and a Passive Infrared (PIR) intrusion monitor 22 having a detection pattern 38. The remote controller 20 may be hand held and includes a button switch 24 and a transmitter circuit 28 and remotely controls the intrusion monitor 22 by transmitting a Radio Frequency (RF) controller signal to a receiver circuit 30. The intrusion monitor 22 is disposed within the predetermined space 10 and can be armed, disarmed, and tested by the controller signal initiated by an authorized user manipulating the button switch 24. When armed, the intrusion monitor 22 produces an alarm response if the detection pattern 38 is entered by the intruder. In addition, the intrusion monitor 22 records and may be tested from outside of the premises 18 by the remote controller 20 for the intrusion so that a returning occupant is warned not to reenter the predetermined space 10, thus avoiding the risk of confronting the intruder. The transmitter circuit 28 and the receiver circuit 30 shown in FIG. 1 operate in a manner similar to the manner in which transmitter and receiver circuits operate in remotely controlled garage door systems having a typical button switch remote which causes a particular RF carrier signal to be transmitted to a receiver to either open or close a garage door. So that interference with other systems in the vicinity does not occur, garage door transmitters are generally tuned to associated receivers by any one of a number of well known methods such as by tuning one to the other in the factory, by matching Dual In-Line Package (DIP) switch settings on the transmitter and the receiver or by the use of a known technique wherein receivers are taught by authorized transmitters to be responsive thereto.

Figure 3:
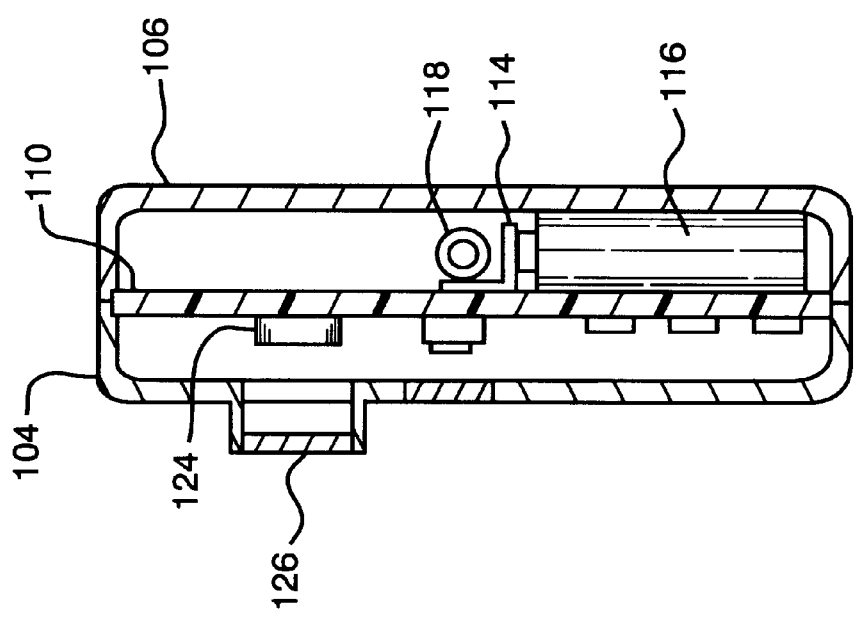
FIG. 3 is a cross section through lines 3—3 of FIG. 2.
Figure 2:
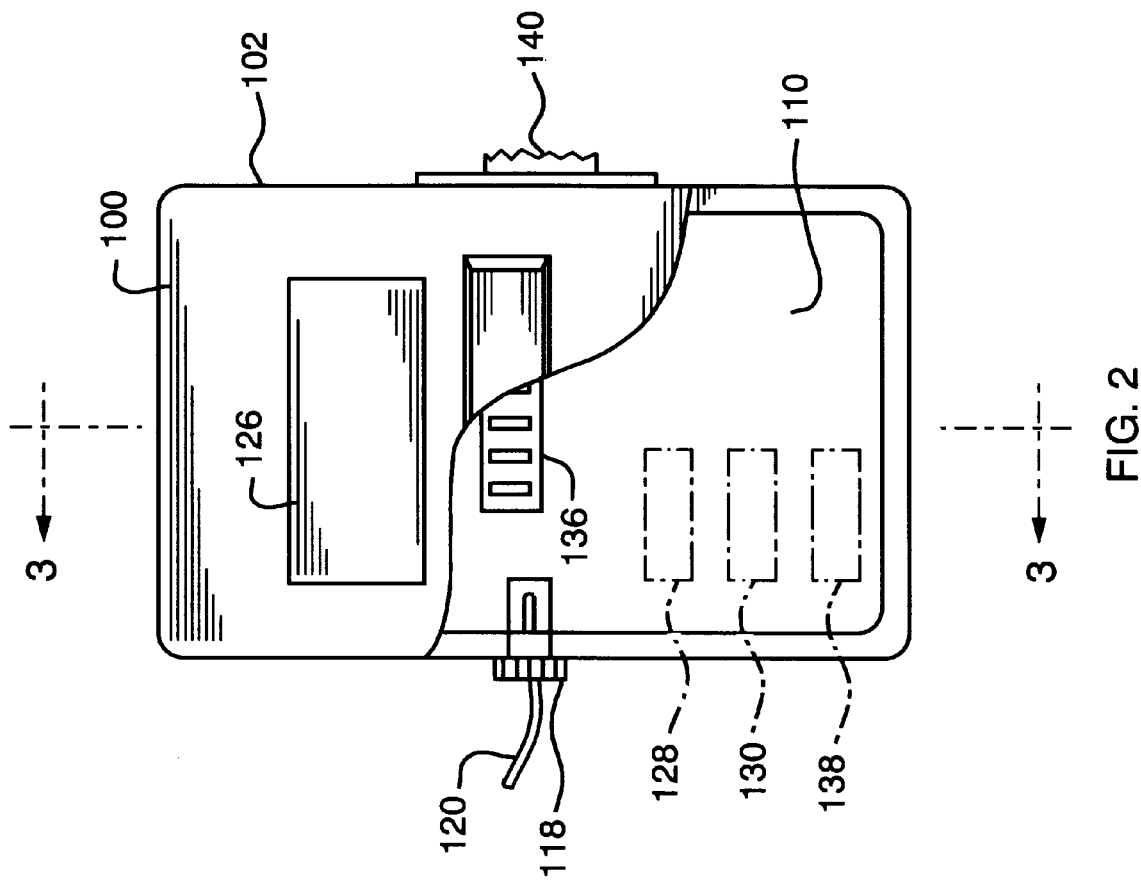
FIG. 2 shows a self-contained monitor employed in a first embodiment of the present invention.

FIGS. 2 and 3 illustrate a first self-contained alarm monitor 100 employed in the first embodiment of the present invention comprising a first monitor housing 102 having a first front section 104, pictured partially fragmented, and a first rear section 106. Each section is preferably molded from plastic resin and is shaped to accommodate the components contained therein. A first PCB 110 has mounted thereon a primary power source 114 including a battery pack 116 and/or a power jack 118 for receiving a first AC adaptor cord 120. A short length of the cord 120 is shown in FIG. 2 supplying a Direct Current (DC) potential to the electrical components of the alarm monitor 100. For the sake of clarity, certain components mounted on the first PCB 110 are shown diagrammatically as defining areas thereon bounded by dashed lines. A known PIR detector 124 is positioned on the first PCB 110 adjacent an arcuate fresnel lens 126 affixed to the first front section 104. The fresnel lens 126 is well known in the art as a means by which to focus infrared energy on the PIR detector 124 in order to sense an intruder entering the detection pattern 38 (FIG. 1). In the first embodiment, the first self-contained monitor 100 comprises a remotely controlled intrusion detector and includes a monitor receiver circuit 128 for receiving the controller signal transmitted by the remote controller 20 (FIG. 1) which arms, disarms and tests the monitor 100. When armed, if the detection pattern 38 (FIG. 1) is intruded, the monitor 100 produces an alarm response to frighten away the intruder, as taught in the prior art.

Unlike the prior art, the first self-contained monitor 100 further comprises a first monitor transmitter 130 which is electrically coupled to the PIR detector 124 and which transmits an RF monitor signal when the PIR detector 124 senses an alarm condition. The monitor receiver circuit 128 may be tuned to the remote controller 20 and the first monitor transmitter 130 may be tuned to its associated receiver, described hereinafter, by any one of the aforementioned known tuning methods. By way of example, a monitor DIP switch 136 is shown in FIG. 2. As will be explained in more detail below, the first monitor transmitter 130 transmits the monitor signal that enables the first self-contained monitor 100 to communicate with a commercially available standard telephone answering machine in order to prompt the recording of the occurrence of the intrusion thereon. A first monitor logic circuit 138, coupled to the first monitor transmitter circuit 130, senses the status of the self-contained monitor 100 and controls the functions thereof. For example, the logic circuit 138 directs the transmitter 130 to transmit the monitor signal and also sound the alarm response when the PIR detector 124 detects an intruder. Further, the first self-contained monitor 100 includes a first slide switch 140 affixed to the monitor housing 102 which, when activated by the user for certain applications as described below, mutes the alarm response so that the first self-contained monitor 100 may communicate with the aforementioned answering machine without alerting the intruder.

Figure 5:
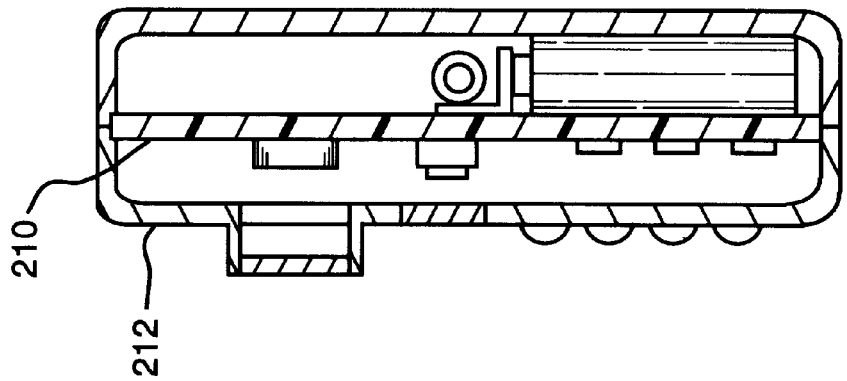
FIG. 5 is a cross section through lines 5—5 of FIG. 4.
Figure 4:
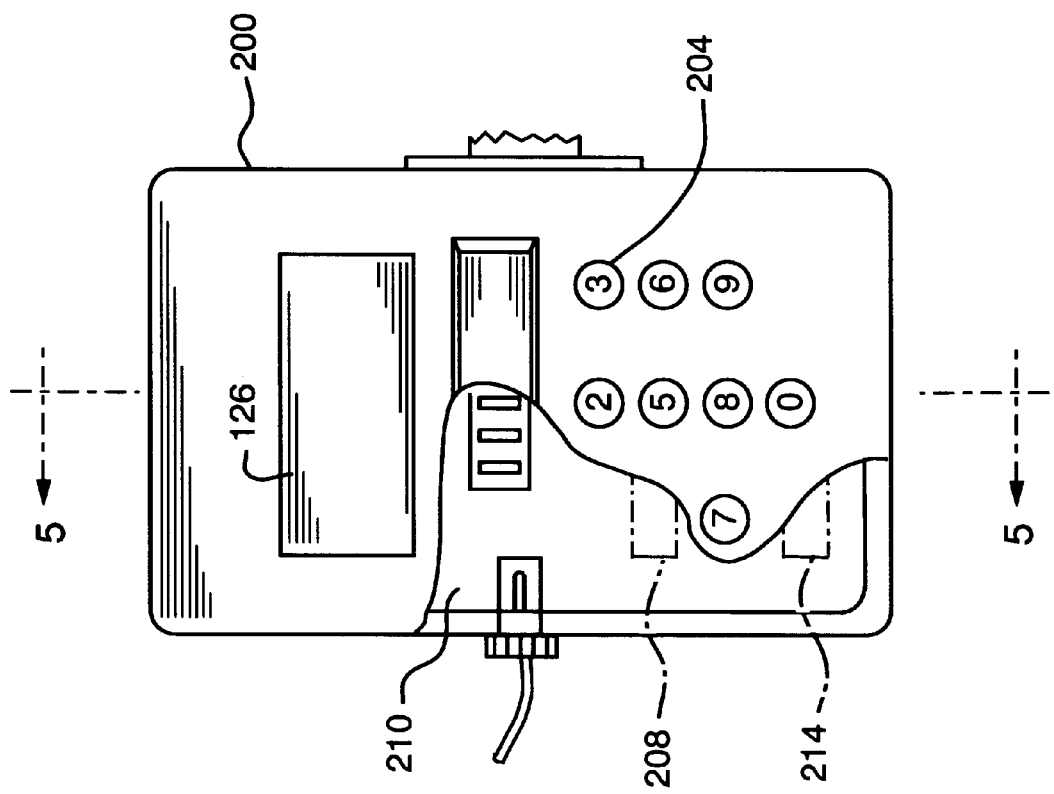
FIG. 4 shows a self-contained monitor employed in a second embodiment of the present invention.

Referring to FIGS. 4 and 5, in the drawings there is shown a second self-contained monitor 200 employed in the second embodiment of the present invention offering certain variations over the first embodiment. Principally, the second self-contained monitor 200 is armed and disarmed by a well known technique of manually inputting either a three or a four digit coded signal into a key pad 204 which is mounted on a second front section 212. Monitors that are armed by the user before leaving the premises 18 (FIG. 1) generally provide an exit time interval during which the occupant may pass through the detection pattern 38 (FIG. 1) while departing without triggering the alarm. Further, since the second self-contained monitor 200 is not armed, disarmed and tested by the remote controller 20 (FIG. 1), the monitor receiver circuit 128 (FIG. 2) is not included therein. However, unlike the prior art intrusion monitor 22 of FIG. 1, the second embodiment comprises a second monitor transmitter 208 mounted on a second PCB 210. As will be explained in more detail below, the second monitor transmitter 208, coupled to a second monitor logic circuit 214, transmits the monitor signal which enables the second self-contained monitor 200 to communicate with almost any standard telephone answering machine in order to record the occurrence of the intrusion thereon. To avoid needless repetition, elements employed in the second embodiment which have been previously described as part of the first, are not described again.

Figure 7:
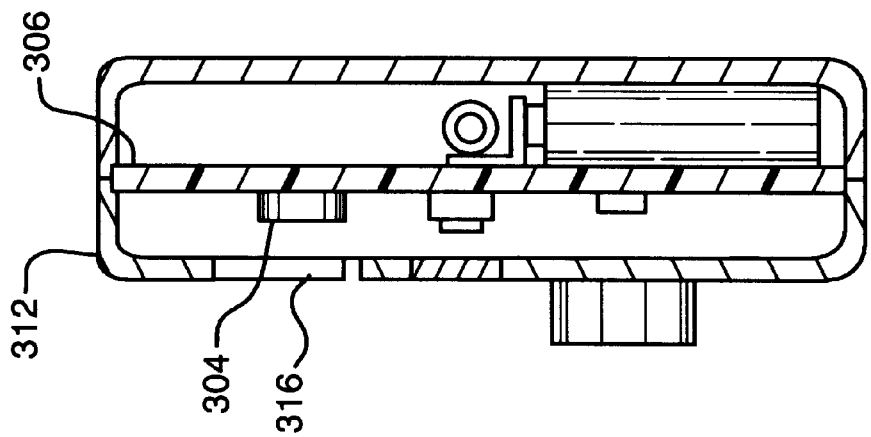
FIG. 7 is a cross section through lines 7—7 of FIG. 6.
Figure 6:
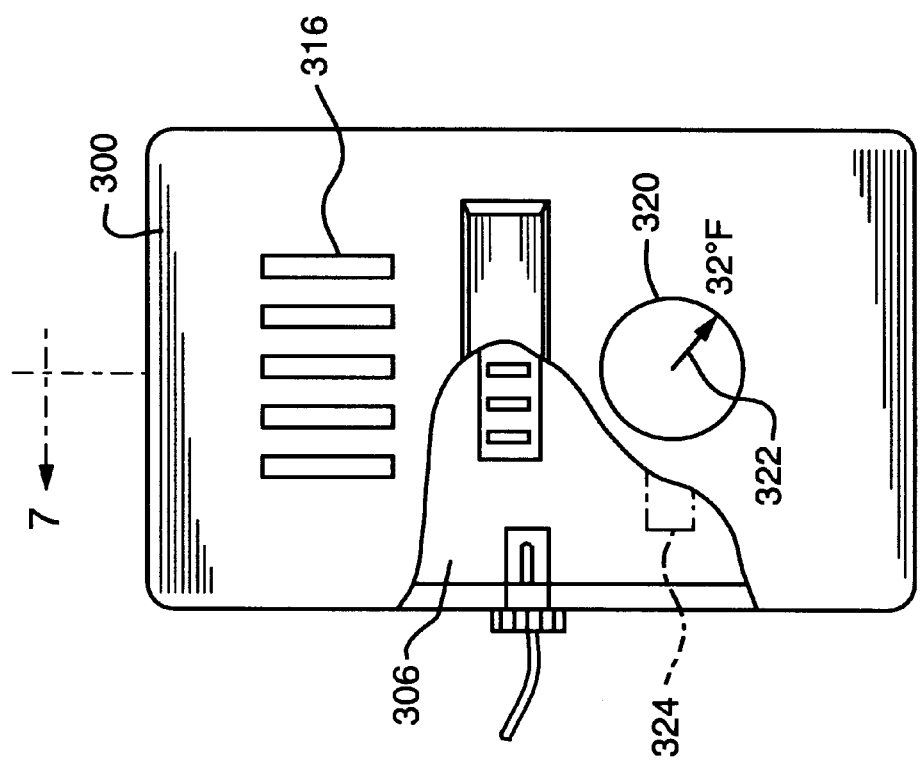
FIG. 6 shows a self-contained monitor employed in a third embodiment of the present invention.

FIGS. 6 and 7 picture a third self-contained monitor 300 employed in the third embodiment of the present invention offering certain variations over the previous embodiments. Principally, the third self-contained monitor 300 is utilized to sense a hazardous temperature in the predetermined space 10 (FIG. 1) rather than an intruder. The third self-contained monitor 300 incorporates a well known commercially available temperature sensor 304 mounted on a third PCB 306 adjacent a third front section 312 providing a plurality of openings 316 which allow ambient air to circulate across the temperature sensor 304 in order to sense the temperature thereof. There is also included a dial 320 having a reference line 322 marked thereon for setting a temperature that the user considers hazardous, for example, thirty-two degrees Fahrenheit the temperature at which water freezes. Preferably, the output of the temperature sensor 304 either opens or closes a relay which, unlike the prior art as explained below, prompts a third monitor transmitter 324 to transmit the monitor signal which enables the third self-contained monitor 300 to cause an alarm message to be recorded on most any telephone answering machine. To avoid needless repetition, elements employed in the third embodiment which are substantially the same as elements in the previous embodiments are not described again as part of the disclosure of the third embodiment. Further, those skilled in the art appreciate that other commercially available sensors, such as a smoke detector, can be utilized in the type of self-contained monitor disclosed herein and, for the sake of brevity, are not described in this disclosure. What follows is a description of the means by which the monitor signal transmitted by each of the self-contained monitors 100, 200 and 300 enables the monitors to communicate with most commercially available telephone answering machines in order to leave an alarm message thereon.

Figure 8:
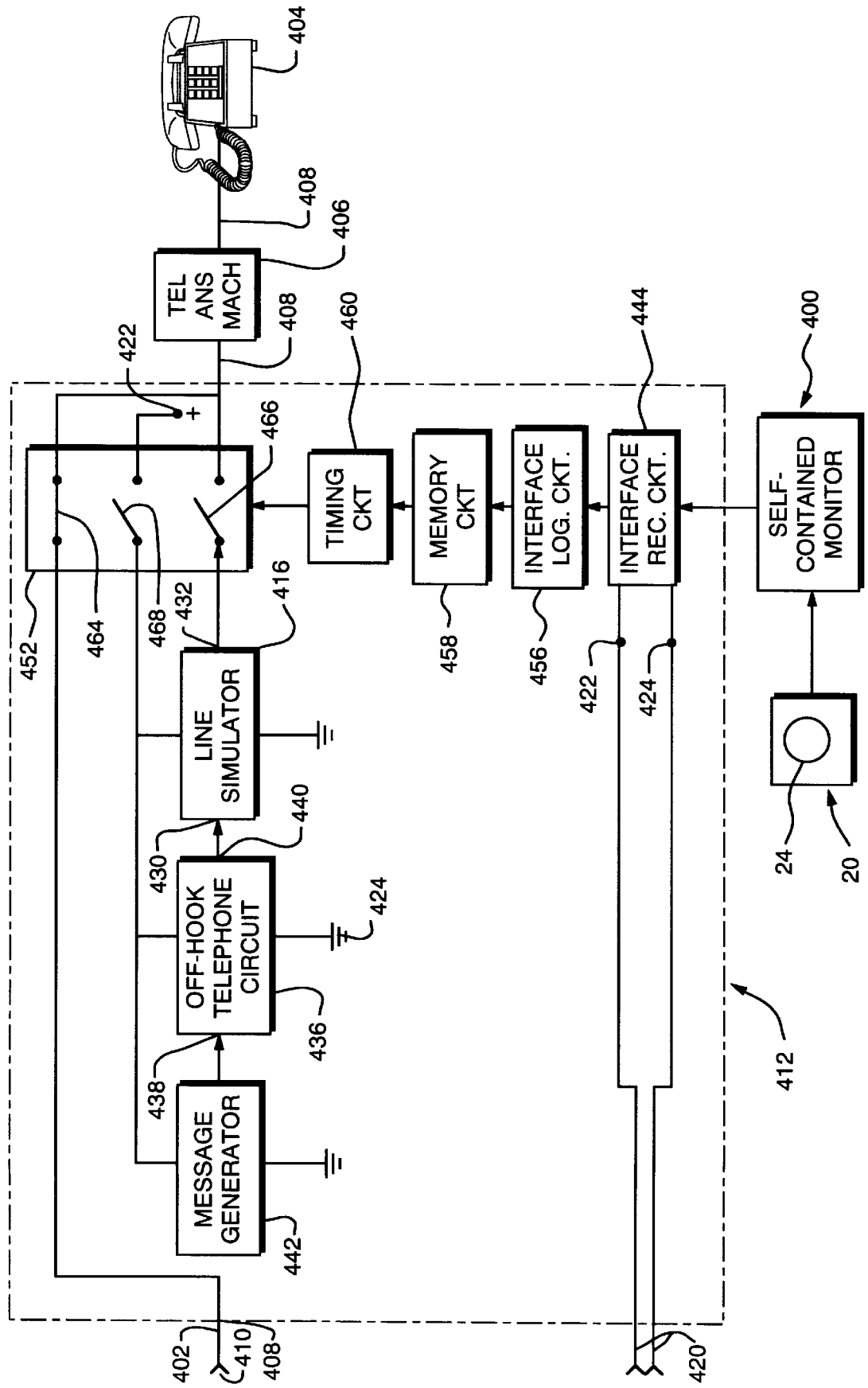
FIG. 8 is a block diagram of the present invention.
Figure 9:
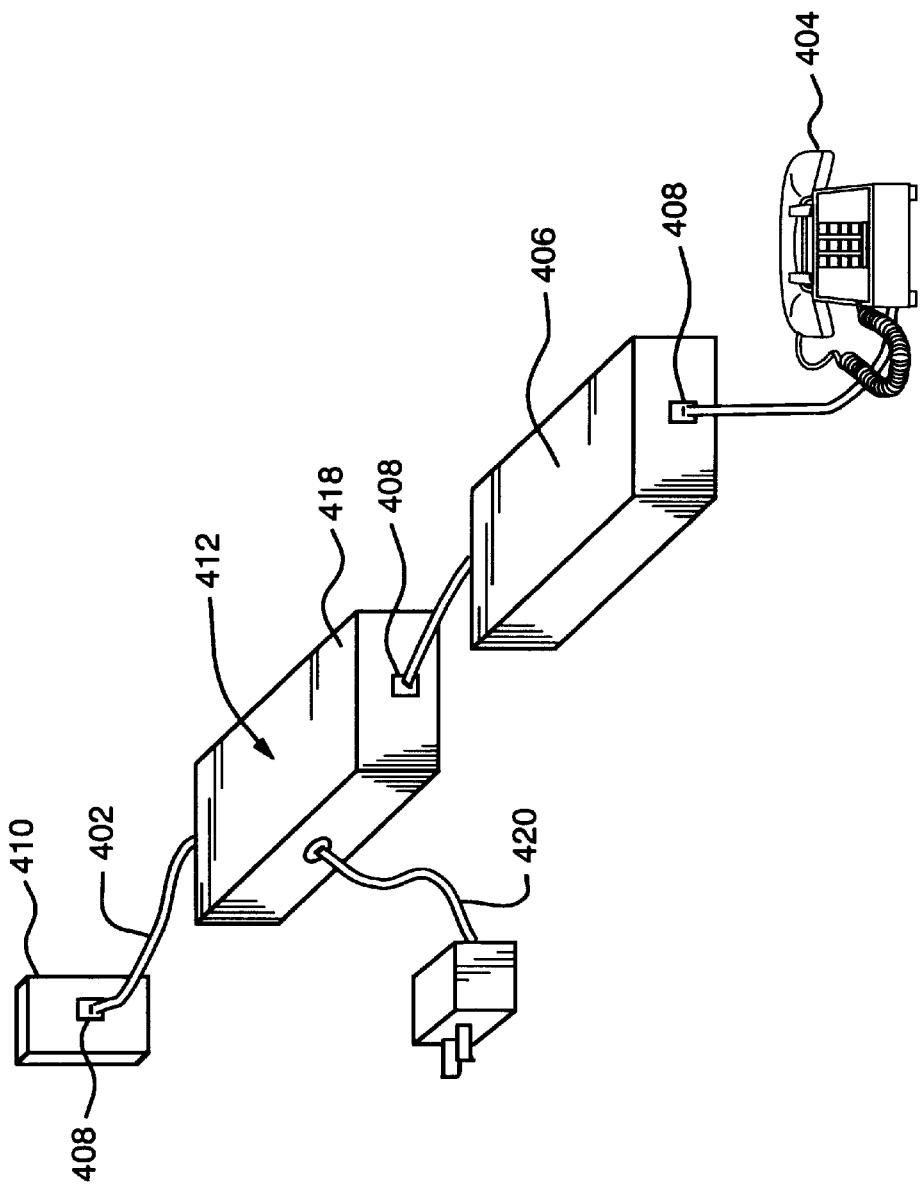
FIG. 9 is a perspective view of selected elements of the present invention.

Turning now to FIGS. 8 and 9, the former is a block diagram of the present invention showing the relationship between elements thereof and the later is a perspective drawing illustrating how certain elements are interconnected. Included below is a description of the elements followed by examples showing how they cooperate with each other in order to record the alarm message and provide the authorized user access thereto. In FIG. 8, there is pictured a self-contained monitor generally referred to by reference number 400 which, by way of example, represents each of the previously described first 100, second 200 and third 300 self-contained monitors. The telephone line 402 may be any one of a number of lines entering the premises 18 (FIG. 1), preferably through a wall outlet 410, and is used to connect the alarm system of the present invention to a public telephone network and ultimately to a distant telephone (not shown). The telephone line 402 is associated with a local telephone number of the premises 18 (FIG. 1) such that telephone equipment coupled thereto may be accessed by a caller dialing the local number from the distant phone. The local telephone 404 is advantageously the occupant's phone which is used by the occupant to communicate with the public network. As is known in the art, telephone lines comprising the public network and commercially available telephone equipment provided for connection thereto are required to meet Federal Communications Commission (FCC) standards which include connecting to the network or to associated telephone equipment by means of a known RJ type connector 408.

In FIGS. 8 and 9, there is depicted a standard telephone answering machine 406, or the electronic equivalent thereof, which preferably meets the aforementioned FCC standards and which is advantageously the answering machine that is employed by the occupant in his or her premises to receive and record incoming telephone calls. Should the occupant not own an answering machine, almost any standard FCC compliant unit may be purchased such as a Model SP-812, Digital Answering System, manufactured by Sprint Communications Company, L.P. Answering machines which meet FCC specifications are activated by a standard ringing voltage (approximately 90 volts at 20 Hertz, applied in a repeated cycle of two seconds on and four seconds off) and may be set to pick up after a preset number of rings, usually two or four. Upon picking up, the answering machine 406 typically transmits a brief announcement inviting the caller to leave an incoming message. Most answering machines are programmed either to hang up subsequent to a predetermined number of seconds after picking up or to hang up if the caller is silent for more than a short period of time, say between four and seven seconds. In either case, the answering machine 406 provides an ample time interval during which to record an incoming message before it automatically hangs up. A number of commercially available answering machines such as the aforementioned Sprint unit provide the user with a synthesized voice report prior to reporting each recorded message indicating the day and time the message was recorded.

It should be noted that standard answering machines, such as the answering machine 406, do not have to be connected to a local telephone 404 in order to receive and record an incoming message. The answering machine 406 typically includes all of the electronic circuitry required to sense the ringing voltage supplied by an FCC compliant telephone line to which it is connected in order to pick up, receive and record either a tone or a voice message therefrom. As the ensuing discussion will show, supplying a locally generated ringing voltage directly to the answering machine 406 causes it to pick up and record a locally generated alarm message which can be retrieved by calling the answering machine 406 from the distant telephone. Alternatively, the alarm message may be retrieved by the user manually activating a known speaker which is usually an integral part of the answering machine 406 in order to listen to the message recorded thereon.

The elements in FIG. 8 shown enclosed by a dashed line comprise an interface module, generally referred to by reference number 412. The interface module 412 is connected in series between the telephone line 402 and the answering machine 406, preferably coupled to each by the RJ connector 408. Furthermore, as will be explained hereinafter, it is the response of the interface module 412 to the monitor signal which causes the alarm message to be transmitted from the interface module 412 to the occupant's telephone answering machine 406. What follows are descriptions of the elements comprising the interface module 412 which is powered by a second AC adapter cord 420 coupled to an interface housing 418 supplying a positive electrical potential 422 and a ground potential 424 to the elements contained therein.

A line simulator 416, as shown in FIG. 8, is known in the prior art and may be purchased from JechTech Inc., Pickerington, Ohio, as their Model LK-1, Link-It. The line simulator 416 electronically simulates an FCC compliant telephone line of the type which is normally provided by a telephone company to a subscriber for processing telephone calls therethrough. In the industry, line simulators are typically employed to test telephone equipment using a simulated telephone line rather than an actual line supplied by the telephone company. The line simulator 416 has a simulator input 430 for connecting to telephone equipment which originates a telephone call and a simulator output 432 for connecting to telephone equipment which receives the call. In the present invention, the line simulator 416 establishes a telephonic connection between the simulator input 430 and output 432 through which the aforementioned locally generated alarm message may be transmitted from a message generator 442 to the telephone answering machine 406. The line simulator 416 includes a ringing generator which, when activated, applies the ringing voltage to the simulator output 432. Further, in the present invention, an off-hook telephone circuit 436 including a message input 438 and a message output 440 provides the electrical characteristics of an off-hook telephone. The message output 440 is coupled to the simulator input 430 and when the off-hook telephone circuit 436 is activated, it originates a simulated telephone call by signalling the line simulator 416 to generate the ringing voltage. If the answering machine 406 is coupled to the simulator output 432, it responds to the ringing voltage by picking up after the preset number of rings and thereby completes a telephonic connection between the message generator 442 and the answering machine 406.

Circuits which simulate off-hook telephones through which telephonic message signals may be transmitted are well known in the art. One such device is a Dial Access Arrangement (DAA) model CH 1804 circuit chip which may be purchased from Cermetek Microelectronics Inc., Sunnyvale, Calif. The message generator 442 is coupled to the message input 438 and, when activated, generates a synthesized voice or tone alarm message which is an electronic signal of frequency and amplitude suitable for being transmitted over the previously described telephonic connection for being recorded on the telephone answering machine 406. The message generator 442 is available from a number of sources such as ISP Products, San Jose, Calif., their model 1110 circuit chip.

An interface receiver circuit 444, similar to the receiver circuit 30 (FIG. 1), is employed to receive and process the monitor signal transmitted by the self-contained monitor 400 and is tuned thereto by any one of the previously discussed tuning methods. Upon receipt of the monitor signal, the interface receiver circuit 444 initiates the processing thereof in order to convert the monitor signal to an electronic operate signal which operates a transfer switch 452 causing the alarm message to be transmitted to the answering machine 406, preferably after a time delay as explained below. What follows describes the time delay, how it is created and how it is employed by the occupant.

When the self-contained monitor 400 is used as an intrusion detector, it is advantageous to provide a preset time delay of preferably ten to fifteen seconds between the instant the interface receiver circuit 444 receives the monitor signal and the instant it prompts the transfer switch 452 to respond so that the occupant can abort the transmission of the alarm message during the time delay in order to avoid needlessly recording a false alarm message on the answering machine 406. To create the time delay, the interface receiver circuit 444 further comprises an interface logic circuit 456 which qualifies the monitor signal, a memory circuit 458 which temporarily stores a qualified monitor signal during the time delay and a timing circuit 460 having the preset time delay programmed therein. At the end of the time delay, the timing circuit 460 is directed by the qualified signal stored in the memory circuit 458 to produce the operate signal that causes the transfer switch 452 to respond. The time delay provides the occupant a time period, if needed, during which he or she can cause an RF monitor abort signal to be transmitted from the monitor 400 to the interface receiver circuit 444 thereby preventing the interface module 412 from transmitting the alarm message to the answering machine 406. If the interface receiver circuit 444 receives the monitor abort signal during the time delay, the logic circuit 456 qualifies it as such and directs the timing circuit not to operate the transfer switch 452.

The monitor abort signal is typically initiated by a returning occupant who trips the alarm when entering his or her premises 18 (FIG. 1) and subsequently disarms the monitor 400, as previously described, in order to turn off the alarm. In the present invention, when the monitor 400 includes an intrusion detector 124 (FIG. 2) which is manually armed and disarmed by the occupant, the monitor 400 transmits an RF disarm signal if it is disarmed while responding to the intrusion. For example, when the monitor 100 (FIG. 2) of the first embodiment is disarmed by the occupant using the authorized remote controller 20 (FIG. 1) while the alarm is sounding, the first monitor logic circuit 138 (FIG. 2) directs the first monitor transmitter 138 (FIG. 2) to transmit the disarm signal. If the disarm signal is received by the interface receiver circuit 444 during the time delay, it is qualified by the interface logic circuit 456 as the abort signal and prevents the alarm message from being transmitted to the telephone answering machine 406.

The transfer switch 452 has a normal position and an activated position and is switched from the normal position to the activated position in response to the operate signal it receives from the timing circuit 460 which holds the transfer switch 452 activated for as long as the operate signal is applied thereto. The transfer switch 452 comprises three form C relays, a first 464, a second 466 and a third 468. Form C relays are known in the art and are available from manufacturers such as American Zetler, Alisio Viejo, Calif. and the Aromat Corp., New Providence, N.J. In the normal position, the first relay 464 connects the telephone line 402 to the answering machine 406 and in the activated position, disconnects the telephone line 402 therefrom while the second relay 466 connects the answering machine 406 to the line simulator 416. In the activated position, the third relay 468 activates the line simulator 416, the off-hook telephone circuit 436 and the message generator 442 by supplying power thereto. It is advantageous to power the aforementioned elements only when needed to minimize the electrical energy consumed by the interface module 412. The operate signal holds the transfer switch 452 in the activated position for a time period which is at least long enough to complete the sequential transmissions of the previously described ringing voltage, announcement and alarm message. The timing circuit 460 can either be programmed to sustain the operate signal for a predetermined period of time, say approximately twenty five seconds, the time required to complete the aforementioned transmissions, or can be coupled to the transfer switch 452 such that it receives a feedback signal therefrom. The feedback signal indicates that the alarm message has been transmitted through the transfer switch 452 and in response thereto, the timing circuit 460 terminates the operate signal. In each of the aforementioned cases, the timing circuit 460 provides a time period at least long enough for the alarm message to be transmitted to and recorded on the answering machine 406.

As previously noted, and as shown in FIG. 9, the interface module 412 serially couples the telephone line 402 to the telephone answering machine 406. During a breakin-the intruder may realize the interface module 412 is part of an alarm installation and may disconnect or disable it. By doing so, the intruder either opens the series connection between the telephone line 402 and the telephone answering machine 406 or causes a short circuit across the two wires which normally comprise the telephone line 402. Subsequently, when the occupant calls the answering machine 406, he or she will receive an unanswered ringing signal, if the intruder has caused an open circuit, or a busy signal, if there is a short circuit. In the present invention, a lack of response from the answering machine 406 alerts the occupant that his or her premises may have been burglarized. Furthermore, it should be pointed out that the elements of the interface module 412 may be included as part of the answering machine 406 thereby combining both devices in a common housing (not shown). In such an arrangement, should the common housing be disconnected or destroyed by the intruder, there will be no response from the answering machine 406 when the occupant calls to retrieve his or her messages, as explained above.

Referring again to FIG. 8, the interface module 412 may be employed in a fourth embodiment of the present invention offering certain variations over the previous embodiments. In the fourth embodiment, as explained below, neither the telephone line 402 nor the telephone 404 are employed in the use thereof. As in the previous embodiments, the interface module 412 receives the monitor signal from the self-contained monitor 400 and responds thereto by transmitting the alarm message to the telephone answering machine 406. However, the user retrieves the alarm message locally over the speaker which is an integral part of the answering machine 406 rather than calling it from the distant telephone which is the preferred retrieval method in the. previous embodiments. Further, in the fourth embodiment, it is not considered advantageous to make outgoing calls from the local telephone 404 while it is connected to the answering machine 406 and therefore the telephone 404 is not used therein. Thus, since neither the interface module 412 nor the answering machine 406 communicates with the public network, they need not meet FCC standards for telephone equipment and are less expensive to manufacture than similar units employed in the previous embodiments.

What follows are four examples describing the cooperation of the elements in FIGS. 8 and 9. In the first example, the self-contained monitor 400 represents the remotely controlled intrusion detector of the first embodiment, as shown in FIG. 2. In the second example, the self-contained monitor 400 represents the intrusion detector of the second embodiment which is controlled by the keypad 204, as shown in FIG. 4. In the third example, the self-contained monitor 400 is adapted for use with the temperature sensor 304, as shown in FIG. 7. Finally, in the fourth example, the user employs the self-contained monitor 400 in combination with the interface module 412 as described above in the disclosure of the fourth embodiment.

Referring again to FIGS. 8 and 9, in the first example when the user leaves the premises 18 (FIG. 1), he or she stands outside thereof and arms the self-contained monitor 400 by manipulating the button switch 24. During the occupant's absence, if the self-contained monitor 400 senses an intruder, it sounds an alarm to frighten away the intruder and at the same time, transmits the monitor signal to the interface receiver circuit 444. Upon receipt thereof, the logic circuit 456 qualifies it as a valid signal, the memory circuit 458 stores it and the timing circuit 460 starts the time delay of ten to fifteen seconds. During an actual break-in, the interface circuit 444 does not receive the monitor abort signal and therefore, after the time delay, activates the transfer switch 452. Once activated, the first form C relay 464 disconnects the telephone line 402 from the answering machine 406, the second form C relay 466 connects the answering machine to the line simulator 416 and the third form C relay 468 turns on the line simulator 416, the off-hook telephone circuit 436 and the message generator 442. After the aforementioned form C relays are activated, the off-hook telephone circuit 436 prompts the line simulator 416 to ring the answering machine 406 which picks up subsequent to the preset number of rings. The answering machine 406 transmits its announcement and then receives and records the alarm message generated by the message generator 442. At the end of the message interval, as previously described, the answering machine 406 hangs up and the form C relays 464, 466 and 468 return to their normal positions. Subsequently, the occupant may call the telephone number associated with the answering machine 406, access the alarm message, and take appropriate action.

If no intrusion occurs during the user's absence, when the user returns he or she stands outside the premises 18 and tests the monitor 400 by manipulating the remote controller 20 to verify the same. The user then enters the premises 18 (FIG. 1) reasonably assured that he or she will not encounter a remaining intruder. Upon entering, if the occupant triggers the alarm, he or she again manipulates the remote controller 20 in order to turn off the alarm and disarm the system thereby prompting the monitor 400 to transmit the abort signal to the interface module 412.

The second example describes the use of the second embodiment wherein the self-contained monitor 400 is armed and disarmed by the coded signal manually input through the keypad 204 (FIG. 4). When leaving the premises 18, the occupant arms the monitor 400 and then exits within the previously described exit time interval, say approximately one minute, in order to avoid triggering the intrusion alarm. If, after the occupant leaves the premises 18 the monitor 400 senses an intrusion, the elements of the monitor 400 and the elements of the interface module 412 cooperate in substantially the same manner as described in the example of the first embodiment starting with the self-contained monitor 400 sensing the intruder, sounding the alarm, and transmitting the monitor signal. For the sake of brevity, the alarm cycle is not described again.

When the self-contained monitor 400 is employed as an intrusion detector, the user has the option of muting the ringing sounds of the telephone 404 and the telephone answering machine 406. As is known in the art, most standard telephones and standard answering machines are equipped with muting switches which silence the ringing sound associated with incoming calls. By muting the ringers, when the intruder trips the alarm, the telephone 404 and the telephone answering machine 406 do not ring and therefore do not alert the intruder that the alarm message is being transmitted to the answering machine 406. Because the intruder triggered the monitor alarm, he or she is aware that their break-in has been detected. However, since the ringer on the answering machine 406 and the ringer on the telephone 404 may be muted, the intruder can never be sure whether the alarm system he or she has encountered is the system of the present invention wherein an alarm message may be transmitted to a secreted answering machine 406 and remotely accessed at any time by the occupant who can notify the police of the break-in, possibly while it is still in progress. Given this uncertainty, the intruder is not likely to remain in the premises.

The third example describes the use of the third embodiment wherein the self-contained monitor 400 is adapted as a temperature alarm. In this example, before leaving the premises 18, the occupant sets the dial 320 (FIG.6) to the temperature which he or she considers hazardous, say thirty two degrees Fahrenheit, the freezing temperature of water. After leaving, if the temperature in the premises reaches the set point, the temperature sensor 304 causes the monitor 400 to emit the monitor signal which is received by the interface receiver 444. Upon receipt thereof, the interface receiver 444 initiates the same alarm cycle as was previously described in the example of the first embodiment. To avoid needless repetition, the steps of the alarm cycle are not repeated in this example.

Finally, the fourth example describes the use of the fourth embodiment wherein the interface module 412 is not connected to the telephone line 402 and the telephone answering machine 406 is not connected to the telephone 404 because the telephone line 402 and the telephone 404 are not used in this embodiment. In the example, the occupant leaves the premises 18 (FIG. 1) with a person remaining therein such as a babysitter, housekeeper or maid. On the way out, the occupant, for whatever reason, asks the person not to enter a particular area within the premises 18 such as the predetermined space 10 defined in FIG. 1. Unbeknownst to the person, the occupant has disposed the self-contained monitor 400 to surveil the predetermined space 10 for an intrusion. Further, the occupant has secreted the interface module 412 coupled to the answering machine 406 in another area in the premises 18 to record the person's intrusion into the predetermined space 10, should one occur. Also, the occupant has muted the self-contained monitor 400 and the answering machine 406 so as not to alert the person regarding the location of these devices and that his or her intrusion has been detected and recorded.

If, during the occupant's absence the person enters the predetermined space 10, the self-contained monitor 400 senses the intrusion and transmits the monitor signal to the interface module 412. Upon receipt thereof, the interface receiver circuit 444 activates the transfer switch 452 which turns on the line simulator 416, the off-hook telephone circuit 436 and the message generator 442 and couples them to the answering machine 406. As previously described, the alarm message is recorded on the answering machine 406 and may subsequently be retrieved by the occupant's activation of the speaker associated therewith. Also, as mentioned above, the synthesized voice message produced by the answering machine reports the day and time any alarm message is recorded.

It is to be understood that the present invention is not limited to the precise details of structure shown and set forth in this specification, for obvious modifications will occur to those skilled in the art to which the invention pertains.

What is claimed is:

1. An alarm system for reporting to an authorized user an occurrence of an alarm condition in a predetermined space comprising:

a self-contained monitor defining a sensor being armed for sensing said alarm condition and a monitor transmitter coupled to said sensor transmitting a monitor signal in response thereto;

an interface module communicating with a telephone line and a telephone answering machine associated with said predetermined space;

said interface module including an interface receiver circuit receiving and processing said monitor signal, a message generator providing an alarm message, an off-hook telephone circuit having a message input and a message output, a line simulator having a simulator input and a simulator output providing a telephonic connection therethrough and applying a ringing voltage to said simulator output, and a transfer switch having a normal position and an activated position;

said message generator being coupled to said message input, said message output being coupled to said simulator input, said transfer switch being coupled to said simulator output and said interface receiver circuit;

said telephone answering machine being coupled to said telephone line in said normal position, being disconnected therefrom and being coupled to said simulator output in said activated position, also, said message generator, said off-hook telephone circuit and said line simulator being activated therein; and responding to said monitor signal, said interface receiver circuit operating said transfer switch to said activated position wherein said off-hook telephone circuit prompts said line simulator to apply said ringing voltage causing said telephone answering machine to pick up thereby completing said telephonic connection through which said alarm message is transmitted from said message generator to said telephone answering machine.

2. An alarm system in accordance with claim 1 wherein said interface receiver circuit further comprises a timing circuit which holds said transfer switch in said activated position for a time period at least long enough for said alarm message to be recorded on said answering machine before prompting said transfer switch to return to said normal position.

3. An alarm system in accordance with claim 1 wherein said interface module is connected in series between said telephone line and said telephone answering machine.

4. An alarm system in accordance with claim 1 wherein said interface module and said telephone answering machine are contained in a common housing.

5. An alarm system in accordance with claim 1 wherein said user calls said telephone line to access said answering machine in order to retrieve said alarm message.

6. An alarm system in accordance with claim 1 wherein said self-contained monitor defines an intrusion sensor armed by said user manually activating a remote controller.

7. An alarm system in accordance with claim 1 wherein said self-contained monitor defines an intrusion sensor armed by said user manually inputting a coded signal into said self-contained monitor through a key pad affixed thereto.

8. An alarm system in accordance with claim 1 wherein said self-contained monitor defines a temperature sensor manually programmed to respond to a preset temperature.

9. An alarm system in accordance with claim 1 wherein said timing circuit causes said interface receiver circuit to activate said transfer switch subsequent to a preset time delay after receiving said monitor signal.

10. An alarm system in accordance with claim 9 wherein said preset time delay is between ten and fifteen seconds.

11. An alarm system in accordance with claim 9 wherein a monitor abort signal may be initiated by said user during said preset time delay to prevent said interface receiver circuit from activating said transfer switch.

12. An alarm system in accordance with claim 1 further comprising a muting switch communicating with said telephone answering machine which, when activated, enables said line simulator to apply said ringing voltage to said answering machine without causing a ringing sound therefrom.

13. An alarm system for reporting to an authorized user an occurrence of an alarm condition in a predetermined space comprising:

a self contained monitor defining a sensor being armed for sensing said alarm condition and a monitor transmitter being coupled to said sensor for transmitting a monitor signal in response thereto;

an interface module communicating with a telephone answering machine;

said interface module including an interface receiver circuit receiving and processing said monitor signal, a message generator providing an alarm message, an off-hook telephone circuit having a message input and a message output, a line simulator having a simulator input and a simulator output providing a telephonic connection therethrough and applying a ringing voltage to said simulator output, and a transfer switch having a normally open position and an activated position;

said message generator being coupled to said message input, said message output being coupled to said simulator input; said transfer switch being coupled to said simulator output and said interface receiver circuit;

said telephone answering machine being coupled to said simulator output in said activated position; and responding to said monitor signal, said interface receiver circuit operating said transfer switch to said activated position wherein said line simulator, said off-hook telephone circuit and said message generator are activated and said off-hook telephone circuit prompts said line simulator to apply said ringing voltage causing said answering machine to pick up thereby completing said telephonic connection between said message generator and said telephone answering machine through which said message generator transmits said alarm message.

14. An alarm system in accordance with claim 13 wherein said interface receiver circuit further comprises a timing circuit which holds said transfer switch in said activated position for a time period at least long enough for said alarm message to be recorded on said answering machine before returning said transfer switch to said normally open position.

15. An alarm system in accordance with claim 13 further comprising a speaker associated with said telephone answering machine being manually activated by said user to retrieve said alarm message.

16. An alarm system in accordance with claim 13 wherein said interface module and said telephone answering machine are contained in a common housing.

17. An alarm system in accordance with claim 13 wherein said self-contained monitor further comprises an intrusion sensor.

18. An alarm system in accordance with claim 13 wherein said self-contained monitor further comprises a temperature sensor.

19. An alarm system in accordance with claim 13 further comprising a muting switch communicating with said telephone answering machine which, when activated, enables said line simulator to apply said ringing voltage to said answering machine without causing a ringing sound therefrom.

* * * * *